United States Patent
Liang et al.

(10) Patent No.: US 10,992,065 B2
(45) Date of Patent: Apr. 27, 2021

(54) MIMO ANTENNA AND TERMINAL

(71) Applicant: AAC Technologies Pte. Ltd., Singapore (SG)

(72) Inventors: Yue Liang, Shenzhen (CN); Jianan Wang, Shenzhen (CN); Yongli Chen, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 27 days.

(21) Appl. No.: 16/703,889

(22) Filed: Dec. 5, 2019

(65) Prior Publication Data

US 2020/0212599 A1 Jul. 2, 2020

(30) Foreign Application Priority Data

Dec. 28, 2018 (CN) .......................... 201811625843.5

(51) Int. Cl.
*H01Q 21/28* (2006.01)
*H01Q 1/24* (2006.01)
*H01Q 1/22* (2006.01)
*H01Q 21/06* (2006.01)
*H01Q 21/30* (2006.01)
*H04B 7/0413* (2017.01)

(52) U.S. Cl.
CPC ........... *H01Q 21/28* (2013.01); *H01Q 1/2283* (2013.01); *H01Q 1/243* (2013.01); *H01Q 21/064* (2013.01); *H01Q 21/065* (2013.01); *H01Q 21/30* (2013.01); *H04B 7/0413* (2013.01)

(58) Field of Classification Search
CPC ...... H01Q 21/28; H01Q 1/2283; H01Q 1/243; H01Q 21/064; H01Q 21/065; H01Q 21/30
See application file for complete search history.

(56) References Cited

U.S. PATENT DOCUMENTS

2014/0191918 A1* 7/2014 Cheng .................. H01Q 21/205
343/834

FOREIGN PATENT DOCUMENTS

CN 103915678 A1 7/2014
CN 106129637 A1 11/2016

OTHER PUBLICATIONS

PCT search report dated Jan. 14, 2020 by SIPO in related PCT Patent Application No. PCT/CN2019/110742 (4 Pages).

* cited by examiner

*Primary Examiner* — Graham P Smith
(74) *Attorney, Agent, or Firm* — W&G Law Group LLP

(57) ABSTRACT

The present invention provides a MIMO antenna. The MIMO antenna includes a regular octagonal substrate and eight antenna components with a same structure arranged along eight edges of the regular octagonal substrate, and the eight antenna components are distributed in an annular array. The present disclosure further provides a terminal applying with the MIMO antenna. The eight antenna components in the MIMO antenna provided by the present disclosure are distributed in an annular array, so that an area occupied by the MIMO antenna in the terminal is greatly reduced; and moreover, the antenna components have good isolation therebetween and are simple in form, and the MIMO antenna has a higher bandwidth.

12 Claims, 4 Drawing Sheets

MIMO ANTENNA AND TERMINAL

TECHNICAL FIELD

The present disclosure relates to the field of wireless communication technologies, and more particularly, to a MIMO antenna and a terminal.

BACKGROUND

With successive implementation of 5G standards, 5G related frequency bands have been basically determined, and the Ministry of Industry and Information Technology of People's Republic of China has issued a notice on the use of Sub-6GHz frequency bands (frequency bands ranging from 3300 MHz to 3600 MHz and frequency bands ranging from MHz 4800 to 5000 MHz) in the 5G system for mobile communication.

5G ultra-dense networking will be the main technical means to meet the demand of mobile data traffic in 2020 and the future. Typical application scenarios of the ultra-dense networking include offices, stadiums, subways, underground parking lots and other areas. 5G ultra-dense networking will greatly increase the number of indoor small base stations. Moreover, the 5G communication system has higher requirements for data transmission rate. One way to improve the data transmission rate is to further increase the number of antennas included in a single base station at a base station terminal.

MIMO (Multiple-Input Multiple-Output) technology is the core technology of 5G antenna. The design difficulty of the MIMO antenna lies in how to integrate multiple antenna components in limited space and obtain high isolation. In the related art, linear layout is mainly adopted in MIMO antenna layout. In order to reduce the overall size, the antenna components have compact layout, close relative distance, strong coupling and poor isolation.

Therefore, it is necessary to provide a novel MIMO antenna and a novel terminal to solve the above-mentioned problems.

DETAILED DESCRIPTION

The following clearly and completely describes the technical solutions in the embodiments of the present disclosure with reference to the accompanying drawings in the embodiments of the present disclosure. Apparently, the described embodiments are merely some but not all of the embodiments of the present disclosure.

Figure 1:
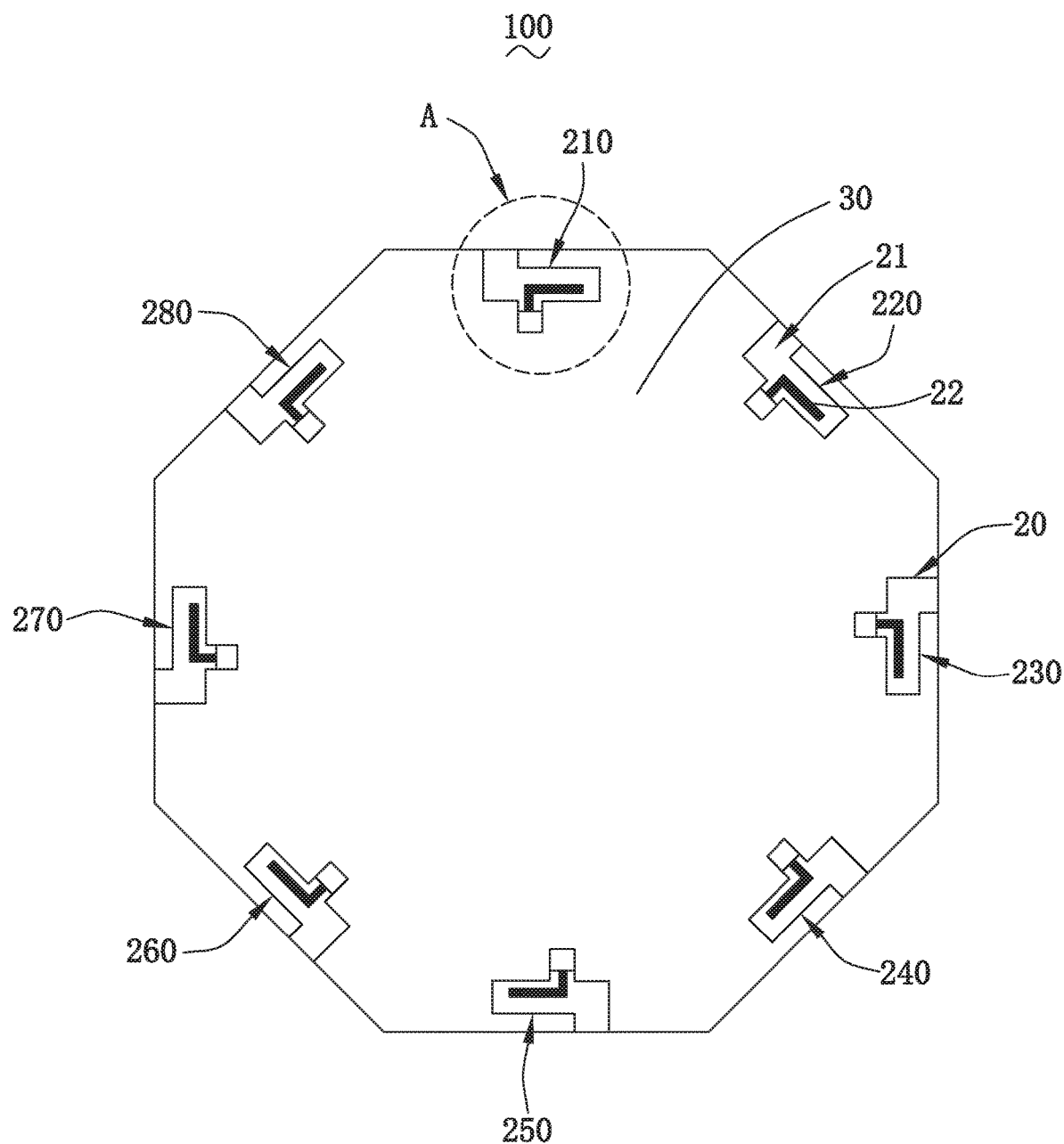
FIG. 1 is a schematic structure diagram of a MIMO antenna provided by the present disclosure.
Figure 2:
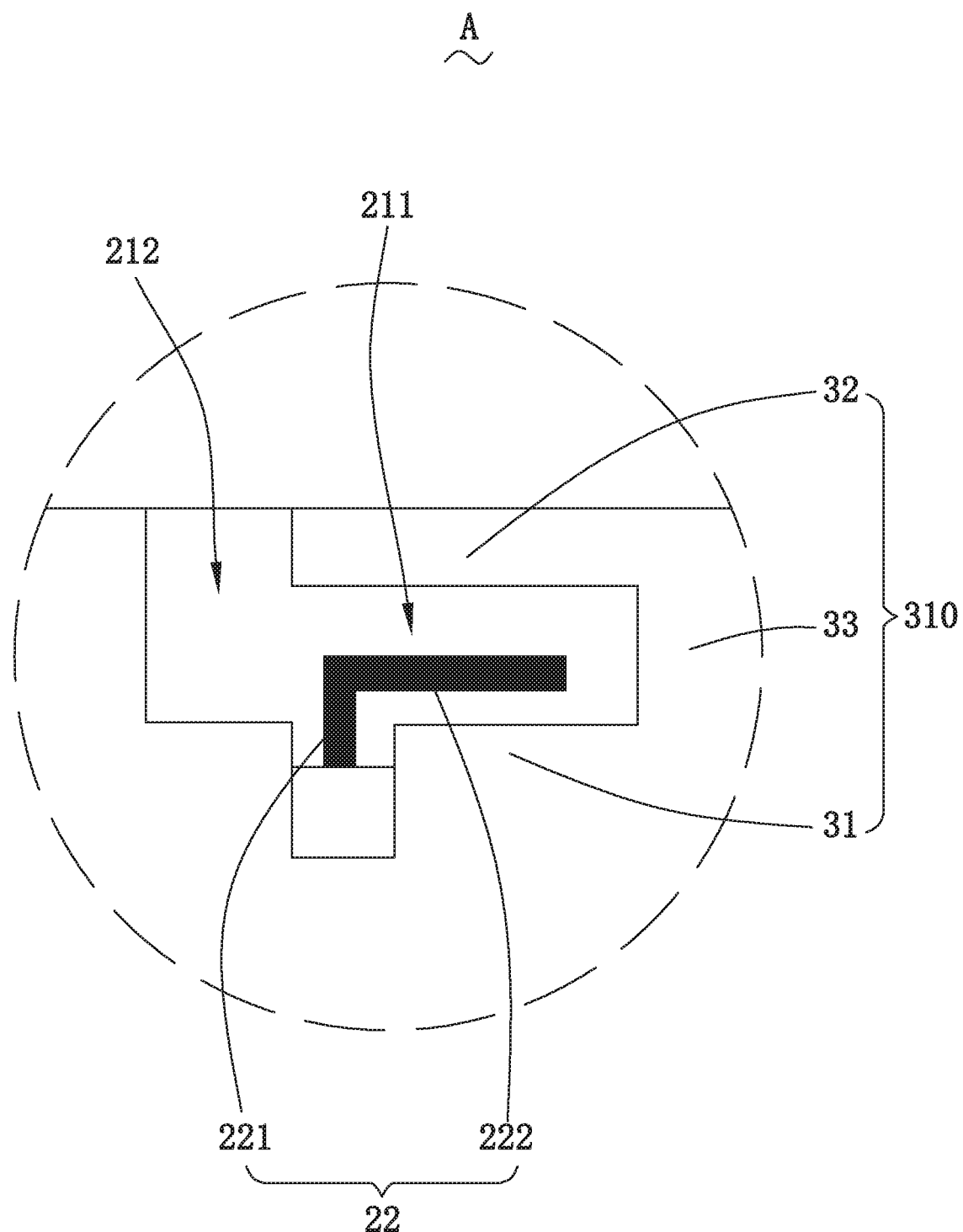
FIG. 2 is an enlarged drawing of a region A in FIG. 1.

As shown in FIG. 1 to FIG. 2, an embodiment of the present disclosure provides a MIMO antenna 100, which may be applied to terminals such as small base stations, and is not limited in the present disclosure.

In this embodiment, the MIMO antenna 100 operates in a frequency band ranging from 3300 MHz to 5000 MHz, which covers the entire Sub6G frequency band in China. In other embodiments, the MIMO antenna may also operate in other frequency bands.

Further, the MIMO antenna is a FPC antenna or a PCB printed antenna, which has a simple manufacturing process, and is easy to implement industrial production.

The MIMO antenna 100 includes a regular octagonal substrate, eight antenna components 20 with a same structure arranged along eight edges of the regular octagonal substrate respectively, and a system ground 30 covering a surface of the regular octagonal substrate. The eight antenna components 20 are distributed in an annular array, i.e., each edge of the regular octagonal substrate is provided with one of the antenna components 20, so that the antenna components 20 are arranged compactly, and an area occupied in the terminal is greatly reduced, and moreover, the substrate is manufactured in a regular octagon, thereby saving materials. The system ground 30 is a metal layer laid on a surface of the regular octagonal substrate.

Specifically, in order to explain the contents of the present disclosure more clearly, the eight antenna components 20 are defined as a first antenna component 210, a second antenna component 220, a third antenna component 230, a fourth antenna component 240, a fifth antenna component 250, a sixth antenna component 260, a seventh antenna component 270, and an eighth antenna component 280 in sequence along a clockwise direction.

Each of the antenna components 20 includes a clearance zone 21 arranged in the system ground 30 and a radiator 22 accommodated in the clearance zone 21. The radiator 22 is configured to outwards radiate electromagnetic waves.

The clearance zone 21 includes a first slot zone 211 and a second slot zone 212 communicated with each other, the radiator 22 is accommodated in the first slot zone 211 and the system ground 310 enclosing the first slot zone 211 is complementary to a shape of the radiator 22; and the second slot zone 212 divides an edge of the system ground 30 into two spaced parts.

The radiator 22 includes a first radiating section 221 extending perpendicularly to one adjacent edge of the regular octagonal substrate and a second radiating section 222 extending parallel to the adjacent edge from one end of the first radiating section 221 close to the adjacent edge, and the first radiating section 221 and the second radiating section 222 form an L-shaped structure. The system ground 310 enclosing the first slot zone 211 includes a first portion 31 and a second portion 32, which are both located at two sides of the second radiating section 222 and spaced parallel to the second radiating section 222, and a third portion 33 connecting the first portion 31 and the second portion 32, wherein the second portion 32 is adjacent to the edge. The second slot zone 212 is arranged at one side of the first radiating section 221 away from the second radiating section 222 so that an end of the second portion 32 adjacent to the first radiating section 221 is open.

Figure 3:
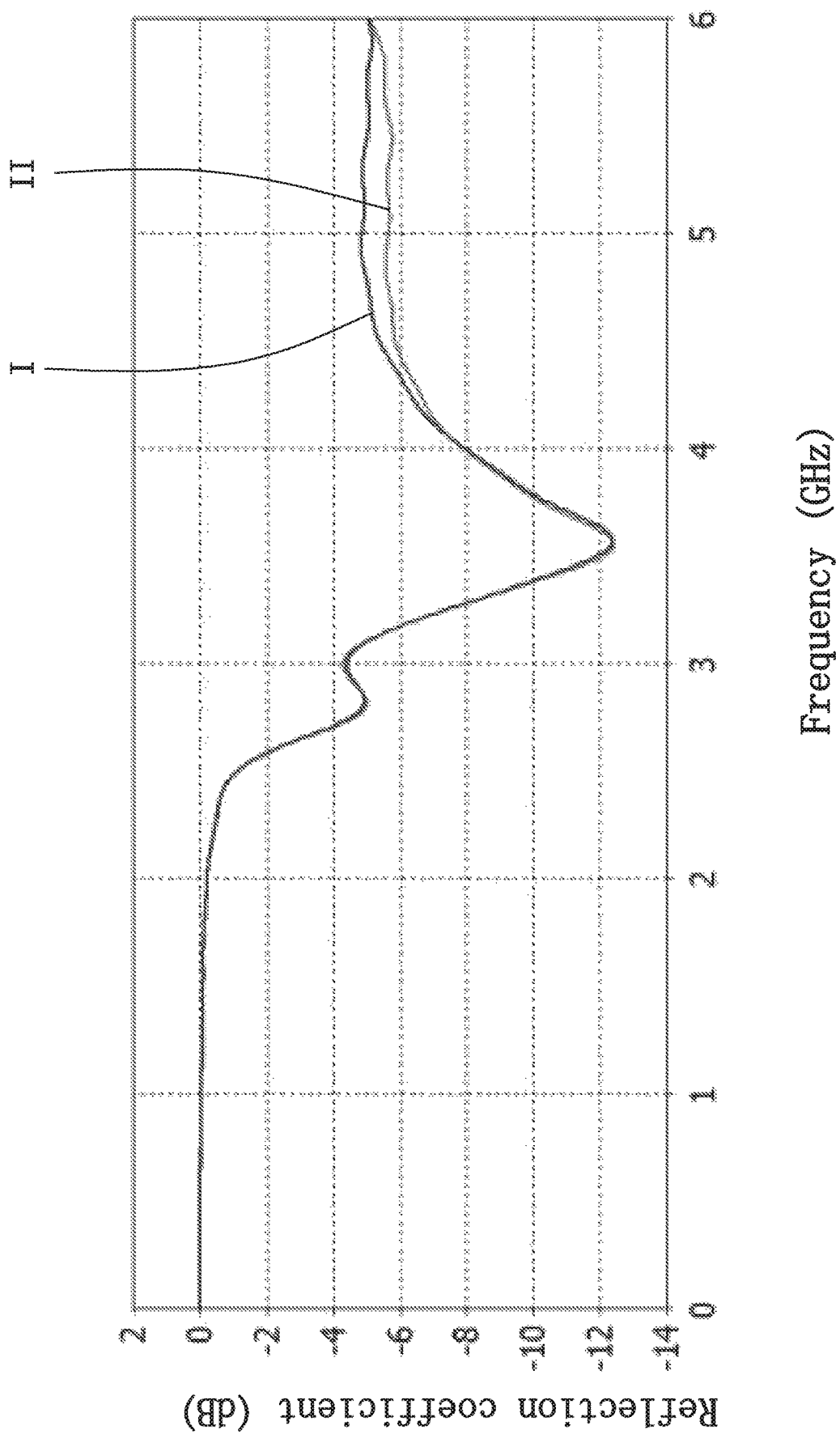
FIG. 3 is a reflection coefficient graph of each antenna component in the MIMO antenna provided by the present disclosure.

As shown in FIG. 3, FIG. 3 is a reflection coefficient graph of each antenna component in the MIMO antenna provided by the present disclosure, wherein curve I is a reflection coefficient curve of the first antenna component 210, the second antenna component 220, the third antenna component 230, the fourth antenna component 240, the fifth antenna component 250, the sixth antenna component 260, and the eighth antenna component 280, the reflection coefficient curves of the seven antenna components are identical, and curve II is the reflection coefficient curve of the seventh antenna component 270. As can be seen from FIG. 3, the reflection coefficients of each antenna component are basically consistent and can cover the Sub 6G frequency band (3300 MHz to 5000 MHz).

Figure 4:
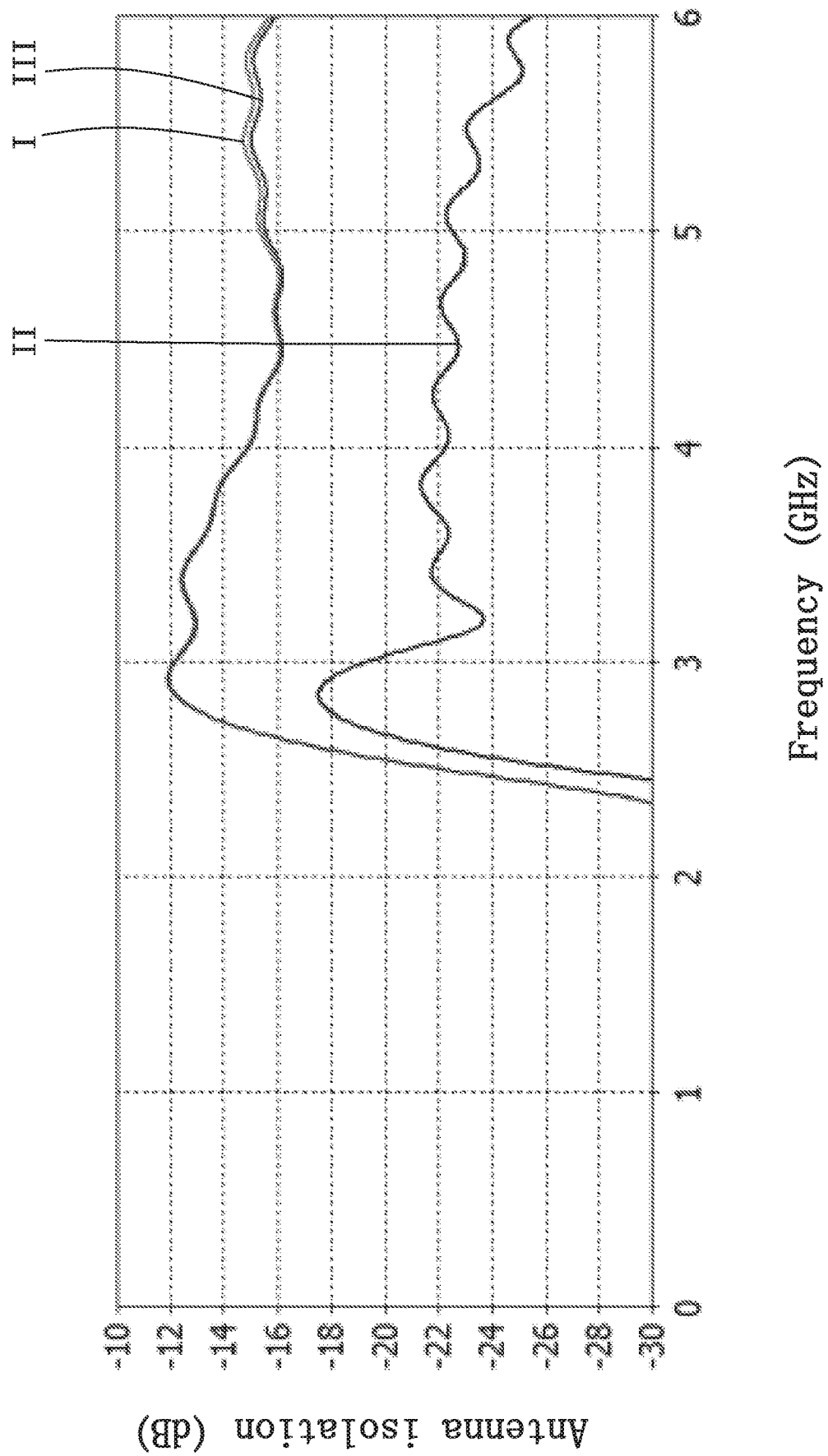
FIG. 4 is an antenna isolation curve between a first antenna component and other antenna components in the MIMO antenna provided by the present disclosure.

As shown in FIG. 4, FIG. 4 is an antenna isolation curve between a first antenna component 210 and other antenna components in the MIMO antenna 100 provided by the present disclosure, wherein curve I is an antenna isolation curve between the first antenna component 210 and the second antenna component 220, curve II is an antenna isolation curve between the first antenna component 210 and the third antenna component 230, curve III is an antenna isolation curve between the first antenna component 210 and the eighth antenna component 280, and an antenna isolation curve between the first antenna component 210 and the fourth antenna component 240, an antenna isolation curve between the first antenna component 210 and the fifth antenna component 250, an antenna isolation curve between the first antenna component 210 and the sixth antenna component 260 and an antenna isolation curve between the first antenna component 210 and the seventh antenna component 270 coincide with curve III. As can be seen from FIG. 4, the isolation between any two antenna components is more than 12 dB in the entire operating frequency band (3300 MHz to 5000 MHz), which indicates that the MIMO antenna 100 has excellent isolation performance between the antenna components.

The present disclosure further provides a terminal, which includes the technical features of the MIMO antenna 100 described above. Of course, the terminal applying with the MIMO antenna 100 also has the above technical effects. Preferably, the terminal is a small base station supporting 4T4R.

Compared with the related art, the eight antenna components 20 in the MIMO antenna 100 provided by the present disclosure are distributed in an annular array, so that an area occupied by the MIMO antenna 100 in the terminal is greatly reduced; and moreover, the antenna components have good isolation therebetween and are simple in form, and the MIMO antenna has a higher bandwidth.

The foregoing descriptions are merely embodiments of the present disclosure, but are not intended to limit the patent scope of the present disclosure. All equivalent structures or equivalent flow transformations made using the description of the present disclosure and the accompanying drawings, or being used directly or indirectly in other related technical fields, are similarly included in the protection scope of the present disclosure.

What is claimed is:

1. A MIMO antenna, comprising:
a regular octagonal substrate; and
eight antenna components with a same structure arranged along eight edges of the regular octagonal substrate respectively;
wherein the eight antenna components are distributed in an annular array.

2. The MIMO antenna according to claim 1, wherein the MIMO antenna further comprises a system ground covering a surface of the regular octagonal substrate, and each antenna component comprises a clearance zone arranged in the system ground and a radiator accommodated in the clearance zone.

3. The MIMO antenna according to claim 2, wherein the clearance zone comprises a first slot zone and a second slot zone communicated with each other, the radiator is accommodated in the first slot zone and the system ground enclosing the first slot zone is complementary to a shape of the radiator, and the second slot zone divides an edge of the system ground into two spaced parts.

4. The MIMO antenna according to claim 3, wherein the radiator comprises:
a first radiating section extending perpendicularly to one adjacent edge of the regular octagonal substrate, and
a second radiating section extending parallel to the adjacent edge from one end of the first radiating section close to the adjacent edge;
wherein the first radiating section and the second radiating section form an L-shaped structure;
the system ground enclosing the first slot zone comprises:
a first portion and a second portion, that are located at two sides of the second radiating section and spaced parallel to the second radiating section, and
a third portion connecting the first portion and the second portion;
wherein the second portion is adjacent to the adjacent edge; and
wherein the second slot zone is arranged at one side of the first radiating section away from the second radiating section, such that an end of the second portion adjacent to the first radiating section is open.

5. The MIMO antenna according to claim 1, wherein the MIMO antenna is a FPC antenna or a PCB printed antenna.

6. The MIMO antenna according to claim 1, wherein the MIMO antenna operates in a frequency band ranging from 3300 MHz to 5000 MHz.

7. A terminal, comprising a MIMO antenna, wherein the MIMO antenna comprises:
a regular octagonal substrate; and
eight antenna components with a same structure arranged along eight edges of the regular octagonal substrate respectively;
wherein the eight antenna components are distributed in an annular array.

8. The terminal according to claim 7, wherein the MIMO antenna further comprises a system ground covering a surface of the regular octagonal substrate, and each antenna component comprises a clearance zone arranged in the system ground and a radiator accommodated in the clearance zone.

9. The terminal according to claim 8, wherein the clearance zone comprises a first slot zone and a second slot zone communicated with each other, the radiator is accommodated in the first slot zone and the system ground enclosing the first slot zone is complementary to a shape of the radiator, and the second slot zone divides an edge of the system ground into two spaced parts.

10. The terminal according to claim 9, wherein the radiator comprises:
a first radiating section extending perpendicularly to one adjacent edge of the regular octagonal substrate, and
a second radiating section extending parallel to the adjacent edge from one end of the first radiating section close to the adjacent edge;
wherein the first radiating section and the second radiating section form an L-shaped structure;
the system ground enclosing the first slot zone comprises:
a first portion and a second portion, that are located at two sides of the second radiating section and spaced parallel to the second radiating section, and
a third portion connecting the first portion and the second portion;
wherein the second portion is adjacent to the adjacent edge; and wherein the second slot zone is arranged at one side of the first radiating section away from the second radiating section, such that an end of the second portion adjacent to the first radiating section is open.

11. The terminal according to claim 7, wherein the MIMO antenna is a FPC antenna or a PCB printed antenna.

12. The terminal according to claim 7, wherein the MIMO antenna operates in a frequency band ranging from 3300 MHz to 5000 MHz.

* * * * *